July 29, 1958
R. BECKER
2,844,944
PROCESS FOR OBTAINING A GAS FRACTION WHICH IS HIGHLY
RICH IN CARBON MONOXIDE FROM A CARBON MONOXIDE
CONTAINING GAS MIXTURE
Filed Dec. 5, 1955
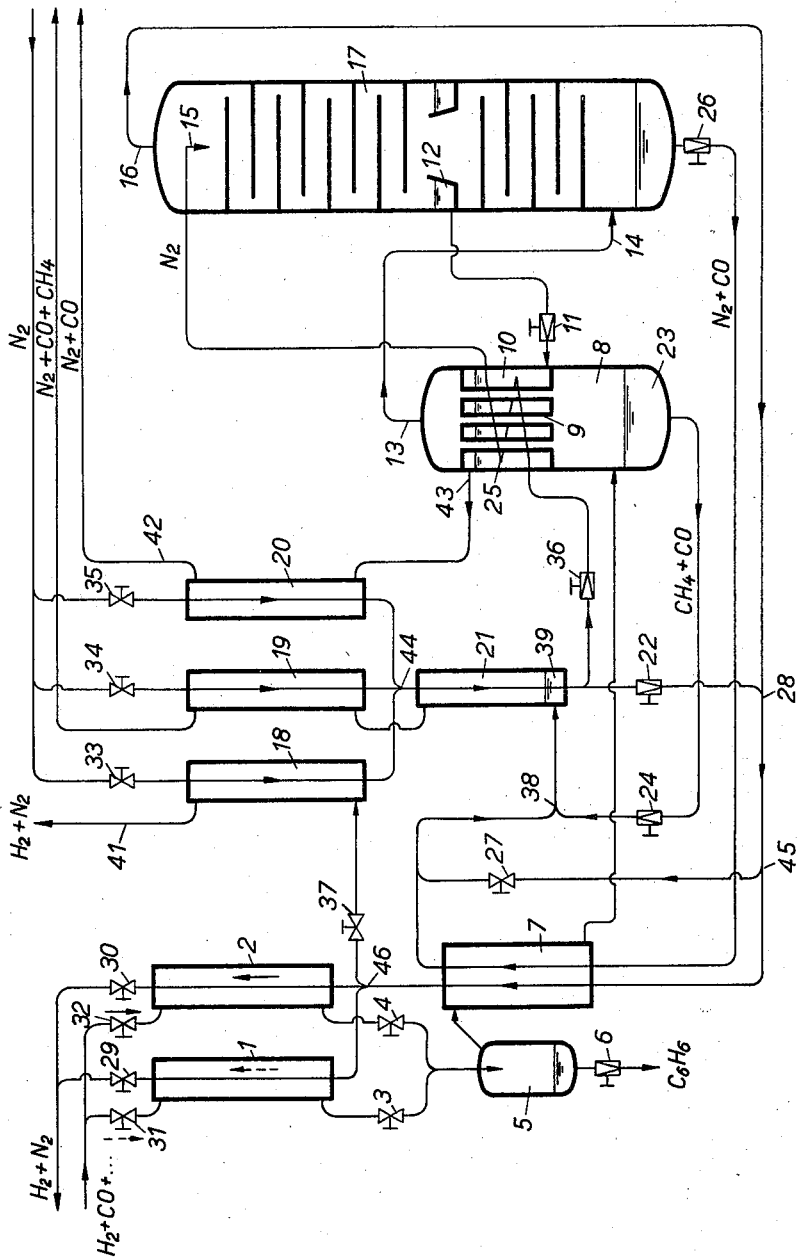

United States Patent Office 2,844,944
Patented July 29, 1958

2,844,944

PROCESS FOR OBTAINING A GAS FRACTION WHICH IS HIGHLY RICH IN CARBON MONOXIDE FROM A CARBON MONOXIDE CONTAINING GAS MIXTURE

Rudolf Becker, Munich-Solln, Germany, assignor to Gesellschaft für Linde's Eismaschinen Aktiengesellschaft, Munich, Germany Application December 5, 1955, Serial No. 551,161

Claims priority, application Germany December 7, 1954

4 Claims. (Cl. 62—25)

The present invention relates to a process for obtaining a gas fraction which is highly rich in carbon monoxide from a carbon monoxide-containing gas mixture, and is concerned with a process for obtaining a gas fraction which is highly rich in carbon monoxide from a crude, compressed gas mixture consisting of a major proportion of hydrogen and a minor proportion of carbon monoxide, together with impurities such as methane, argon, oxygen, nitrogen and the like.

In the conventional low-temperature installations for producing ammonia synthesis gas from condensed and carbon monoxide-containing gas mixtures having hydrogen as their main constituent, the last impurities are usually removed in a final stage by washing with substantially pure liquefied nitrogen. This is generally effected by means of washing trays, a mixture of hydrogen and nitrogen which is practically free from other impurities being drawn off from the upper end of the washing column. The impurities in question are the usual gas constituents, namely methane, argon, oxygen and carbon monoxide. The washing liquid containing these impurities is taken from the column bottom as a mixture which is rich in carbon monoxide, i. e. which contains, for example, up to 55% carbon monoxide, together with nitrogen and also smaller quantities of dissolved hydrogen, argon, oxygen and methane.

It has now been found that the carbon monoxide fraction in the washing liquid can be increased quite considerably by taking from the washing column a liquid nitrogen fraction which is poor in carbon monoxide, e. g. a fraction of the discharging liquid nitrogen with approximately 1% carbon monoxide is taken at a specific distance from the bottom tray.

It is an object of the present invention to provide a process for obtaining a gas fraction which is highly rich in carbon monoxide from a crude, compressed gas mixture consisting of a major proportion of hydrogen and a minor proportion of carbon monoxide, together with impurities such as methane, argon, oxygen, nitrogen and the like, comprising the steps of cooling the compressed, crude mixture to low temperatures in a first heat-exchange with a substantially pure nitrogen and hydrogen mixture, in a second heat-exchange with evaporating liquid nitrogen, which is rich in carbon monoxide absorbed from said crude mixture, and in a third heat-exchange with evaporating liquid nitrogen, which is poor in carbon monoxide absorbed from said mixture, collecting a condensate consisting essentially of carbon monoxide from the super-cooled, crude mixture, washing the remainder of said mixture to produce said carbon monoxide poor nitrogen fraction, said substantially pure nitrogen and hydrogen, and said carbon monoxide rich nitrogen fraction, and supplying evaporating liquid from said condensate to the latter fraction to produce the highly rich gas fraction.

The point from which this nitrogen fraction is taken depends on the desired maximum concentration of carbon monoxide and can be determined by calculation or experiment. 5% represents approximately the upper limit of carbon monoxide concentration in the fraction taken. The quantity tapped off can also be regulated according to requirements. A 10–40% fraction of the total amount of washing liquid is an advantageous range.

The liquid fraction taken off can be heated by itself and discharged after it has delivered up its cold.

The withdrawal of an intermediate liquid fraction in the upper portion of the lower half of the washing column reduces the washing agent surplus in this zone, and the concentration of carbon monoxide in the washing liquid running out of the column bottom is substantially increased. In this way, it has been found possible to increase the carbon monoxide concentration in the washing liquid to nearly 80%, so that the carbon monoxide fraction may be put to a useful purpose.

For a better understanding of the invention, reference will now be made to the accompanying drawing, which shows diagrammatically an apparatus for obtaining a carbon monoxide-rich fraction from a mixture containing a major proportion of hydrogen and a minor proportion of carbon monoxide. A mixture of 91.3% hydrogen and 5.9% carbon monoxide, the remainder consisting of nitrogen, argon, oxygen and methane, is subjected to low-temperature cooling under a pressure of 28 atmospheres absolute. The gas mixture is first passed through one of two alternately operated heat-exchangers 1 and 2 (e. g. exchanger 2 by way of valves 32 and 4; to a separator 5 with a condensate pressure-release valve 6). The mixture is then conducted through a heat-exchanger 7, where a washing medium charged with crude gas and withdrawn from a subsequent washing column 17 is evaporated in heat-exchange with the mixture, and subsequently passes into a condenser 8, where a further fraction is separated out (at 23), e. g. in reflux tubes 9. The condenser 8 is cooled by liquid nitrogen evaporating in an evaporator 10. The nitrogen has been taken with an admixture of approximately 1% carbon monoxide from a collecting cup 12 in the nitrogen washing column 17 and expanded by way of a valve 11 into the evaporator 10. The crude gas constituents which have not been condensed in the condenser 8, and which consist mainly of non-liquefied carbon monoxide, argon, nitrogen and methane impurities, are drawn off at 13 and introduced at 14 into the lower part of the washing column 17. The gas flows in this column in counter-current to nitrogen trickling down over trays and supplied at 15. The pure washed gas, which is washed under a pressure of approximately 27 atmospheres absolute, and which contains practically only hydrogen and nitrogen, is taken off at 16 from the washing column and delivers up its cold to compressed crude gas in the exchangers 7 and 2 (or 1) and to nitrogen under pressure in an exchanger 18. A washing liquid fraction rich in carbon monoxide is taken from the bottom of the column 17 through a valve 26 and is evaporated in the exchangers 7 and 21 (at 39).

For the purpose of refrigeration, nitrogen is taken from outside the apparatus which is illustrated, e. g. from an air-separating device, compressed to a high degree, supplied through valves 33, 34 and 35, and in heat-exchange with the products of the process, cooled and liquefied.

The first cooling of the compressed nitrogen (200 atmospheres over pressure) is carried out within the exchangers 18, 19 and 20, the further cooling being carried out after the currents have been combined at 44, in the exchanger 21 in heat-exchange with an evaporating methane-carbon monoxide mixture (from the column bottom 23), and in tubes 25 in the evaporator 10. The liquefied nitrogen is delivered as washing liquid at 15 to the washing column 17. The cold output which the process requires is obtained primarily by the expansion of the nitrogen, e. g. in the expansion valves 22 and 36. The pressure of the nitrogen is adapted to the requisite cold output.

The methane-carbon monoxide fraction from the bottom 23 is expanded by way of valve 24, and is completely evaporated in the exchanger 21, together with a nitrogen-carbon monoxide fraction which is combined with the CH$_4$—CO fraction at 38 and is partly evaporated. This evaporation causes the liquefication of compressed nitrogen which is cooled in the exchanger 21. The evaporated fraction is then heated to ambient temperature in the exchanger 19 and conveyed away through a pipe 40. The nitrogen fraction evaporated in the nitrogen evaporator 10 is drawn off at 43 and guided away through the exchanger 20 and a pipe 42. The pure gas containing practically only hydrogen and nitrogen is mixed at 28 with additional nitrogen which has been allowed to expand at 22, and gives up a proportion thereof at 45 or 46 by way of valve 27 or 37, as the case may be, to the nitrogen exchanger 18, and is then conducted by way of a pipe 41 to its particular use. A further proportion of the nitrogen-hydrogen mixture travels by way of the branch point 46 and alternately through exchanger 1 or 2 and valve 29 or 30, under pressure, to the use for which it is intended. The crude gas is supplied alternately by way of valves 32 and 4 or 31 and 3. The exchangers are changed over as usual when the tube cross-sections in the crude gas portion begin to be obstructed with solid deposits (ice and benzol). The shut-off valves 29 to 32, and 3 and 4 are either wholly closed or wholly open, according to whether the exchanger 1 or 2 is being operated. The valves 33, 34 and 35 serve to distribute the compressed nitrogen, which is used for refrigeration, to the individual exchangers 18, 19 and 20. The compressed nitrogen is expanded to washing column pressure in the valve 36.

I claim:
1. A process for obtaining a gas fraction which is highly rich in carbon monoxide from a crude, compressed gas mixture, consisting of a major proportion of hydrogen and a minor proportion of carbon monoxide, together with impurities such as methane, argon, oxygen, nitrogen and the like, comprising the steps of cooling the compressed, crude mixture to low temperatures to form a supercooled crude mixture in a first heat-exchange with a substantially pure nitrogen and hydrogen mixture, in a second heat-exchange with evaporating rich carbon monoxide-nitrogen liquid fraction, and in a third heat-exchange with an evaporating poor carbon monoxide-nitrogen liquid fraction, collecting a condensate consisting essentially of carbon monoxide from said super-cooled, crude mixture, supplying said crude gas mixture and liquid nitrogen to opposite ends of a washing column to produce the poor carbon monoxide nitrogen fraction, the substantially pure nitrogen and hydrogen, and the rich carbon monoxide-nitrogen fraction, withdrawing the poor carbon monoxide-nitrogen fraction from said column as an intermediate fraction containing less than 5% carbon monoxide and supplying evaporating liquid from said condensate to the latter fraction to produce a highly rich gas fraction.

2. A process according to claim 1, wherein said intermediate fraction amounts to between 10 and 40% of the nitrogen washing liquid supplied at the head of the washing column.

3. A process according to claim 1, further comprising the steps of cooling highly compressed nitrogen in a first heat-exchange with said substantially pure nitrogen and hydrogen mixture, with said highly rich gas fraction and with the poor carbon monoxide-nitrogen fraction, liquefying the cooled nitrogen in a second heat-exchange with an evaporating rich carbon monoxide nitrogen fraction enriched with liquid from said condensate, expanding the liquefied nitrogen, further cooling the expanded liquid nitrogen in heat-exchange with evaporating nitrogen which is poor in carbon monoxide, and supplying the super-cooled liquid nitrogen as a washing liquid to said washing column.

4. Apparatus for obtaining a fraction which is highly rich in carbon monoxide from a crude, compressed gas mixture, comprising a washing column for scrubbing a compressed, crude gas mixture free of carbon monoxide by means of liquid nitrogen, a condenser for receiving liquid separated from a super-cooled, crude mixture, an evaporator formed in said condenser for an evaporating poor carbon monoxide-nitrogen fraction, to cool said crude mixture, a cooling coil for liquid nitrogen in said evaporator, a collecting cup for the poor carbon monoxide-nitrogen liquid fraction liquid nitrogen formed in the washing column at about the middle thereof, separate conduit means connecting the outlet of said coil to the head of said column, said cup to said evaporator and the head of said condenser to the lower end of said column, heat-exchangers for super-cooling a crude mixture supplied to said condenser in heat-exchange with washed gas from the head of said column and with evaporating bottom liquid from said column, thereby to form said super-cooled crude mixture in said condenser further heat-exchangers for cooling compressed nitrogen in heat-exchange with the gaseous products from said washing column, a heat-exchanger for liquefying the cooled nitrogen in heat-exchange with evaporating bottom liquids from said washing column and from said condenser, conduit means for liquid nitrogen connected between said evaporator and said cooling coil and an expansion valve in the latter conduit means.

References Cited in the file of this patent
UNITED STATES PATENTS

| | | |
|---|---|---|
| 1,511,800 | Claude | Oct. 14, 1924 |
| 1,605,646 | Claude | Nov. 2, 1926 |
| 1,723,425 | Jaubert | Aug. 6, 1929 |
| 1,773,012 | Schuftan | Aug. 12, 1930 |
| 1,885,059 | Cicali | Oct. 25, 1932 |

FOREIGN PATENTS

| | | |
|---|---|---|
| 529,014 | France | Aug. 30, 1921 |
| 723,457 | France | Jan. 18, 1932 |
| 878,490 | France | Oct. 12, 1942 |
| 231,444 | Great Britain | 1926 |
| 764,953 | Germany | May 15, 1952 |